(12) United States Patent
Shen-Orr et al.

(10) Patent No.: US 8,051,292 B2
(45) Date of Patent: Nov. 1, 2011

(54) SYSTEM FOR PROXIMITY DETERMINATION

(75) Inventors: Chaim D. Shen-Orr, Haifa (IL); Eliphaz Hibshoosh, Tel Aviv (IL); Yaacov Belenky, Maaleh Adumim (IL)

(73) Assignee: NDS Limited, Staines, Middlesex (GB)

( * ) Notice: Subject to any disclaimer, the term of this patent is extended or adjusted under 35 U.S.C. 154(b) by 1130 days.

(21) Appl. No.: 11/629,435

(22) PCT Filed: May 11, 2005

(86) PCT No.: PCT/IL2005/000499
§ 371 (c)(1),
(2), (4) Date: Feb. 21, 2007

(87) PCT Pub. No.: WO2006/018826
PCT Pub. Date: Feb. 23, 2006

(65) Prior Publication Data
US 2007/0300070 A1     Dec. 27, 2007

Related U.S. Application Data

(60) Provisional application No. 60/583,338, filed on Jun. 28, 2004.

(51) Int. Cl.
*H04L 29/00* (2006.01)
(52) U.S. Cl. ............. 713/176; 713/161; 726/2; 380/270
(58) Field of Classification Search .................. 713/176, 713/161; 380/270; 726/2
See application file for complete search history.

(56) References Cited

U.S. PATENT DOCUMENTS

| | | | |
|---|---|---|---|
| 6,178,449 B1 * | 1/2001 | Forman et al. ................ | 709/224 |
| 6,505,240 B1 | 1/2003 | Blumenau | |
| 6,826,690 B1 * | 11/2004 | Hind et al. .................... | 713/186 |
| 6,865,612 B2 * | 3/2005 | Kurth et al. ................... | 709/238 |
| 2002/0087666 A1 | 7/2002 | Huffman et al. | |
| 2003/0046022 A1 | 3/2003 | Silverman | |
| 2003/0085997 A1 * | 5/2003 | Takagi et al. ................. | 348/143 |
| 2003/0097655 A1 * | 5/2003 | Novak ............................ | 725/31 |
| 2004/0128387 A1 | 7/2004 | Chin et al. | |

FOREIGN PATENT DOCUMENTS

| | | |
|---|---|---|
| WO | WO 01/93434 A2 | 12/2001 |
| WO | WO 02/35036 A1 | 5/2002 |
| WO | WO 03/079638 A1 | 9/2003 |
| WO | WO 2004/014037 A1 | 2/2004 |

(Continued)

OTHER PUBLICATIONS

SVP—Secure Video Processor, "Frequently Asked Questions" available on the World Wide Web at www.svpalliance.org. (6 pages).

(Continued)

*Primary Examiner* — Vivek Srivastava
*Assistant Examiner* — Anthony Brown
(74) *Attorney, Agent, or Firm* — Husch Blackwell LLP

(57) ABSTRACT

In connection with network elements in a network, enhancing security by measuring proximity between elements, that are communicating with each other, by using facilities of secure devices and secure elements in the network. In some embodiments, secured information stored in a device certificate comprises a device processing delay, and the device processing delay is used in calculating a net response time which is compared to a threshold.

35 Claims, 8 Drawing Sheets

FOREIGN PATENT DOCUMENTS

| | | |
|---|---|---|
| WO | WO 2004/030311 A1 | 4/2004 |
| WO | WO 2004/030312 A1 | 4/2004 |

OTHER PUBLICATIONS

Nov. 12, 2009 supplementary search report for EP 05 74 0622.5.

A. Menezes et al., Handbook of Applied Cryptography, Chapter 12 (CRC press, Inc. 1997).

A. Menezes et al., Handbook of Applied Cryptography, Chapter 13 (CRC press, Inc. 1997).

Jul. 23, 2010 Office Communication in connection with prosecution of AU 2005 273532.

Mar. 31, 2010 Office Communication in connection with EP 05 740 622.5 (8 pgs.).

Jan. 27, 2010 Office Communication in connection with AU 2005 273532.

Oct. 7, 2010 Office Communication in connection with prosecution of IL 180021 (w/English translation).

May 31, 2011 Office Communication in connection with prosecution of EP 05 740 622.5.

* cited by examiner

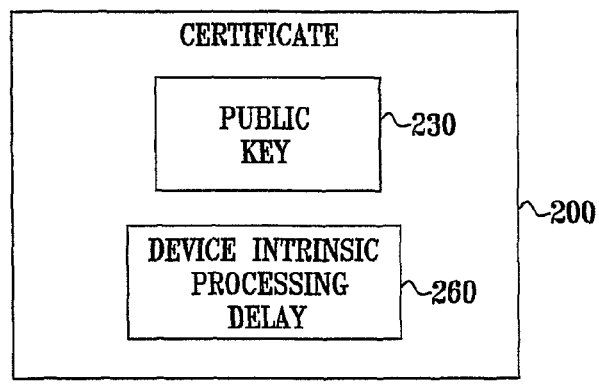
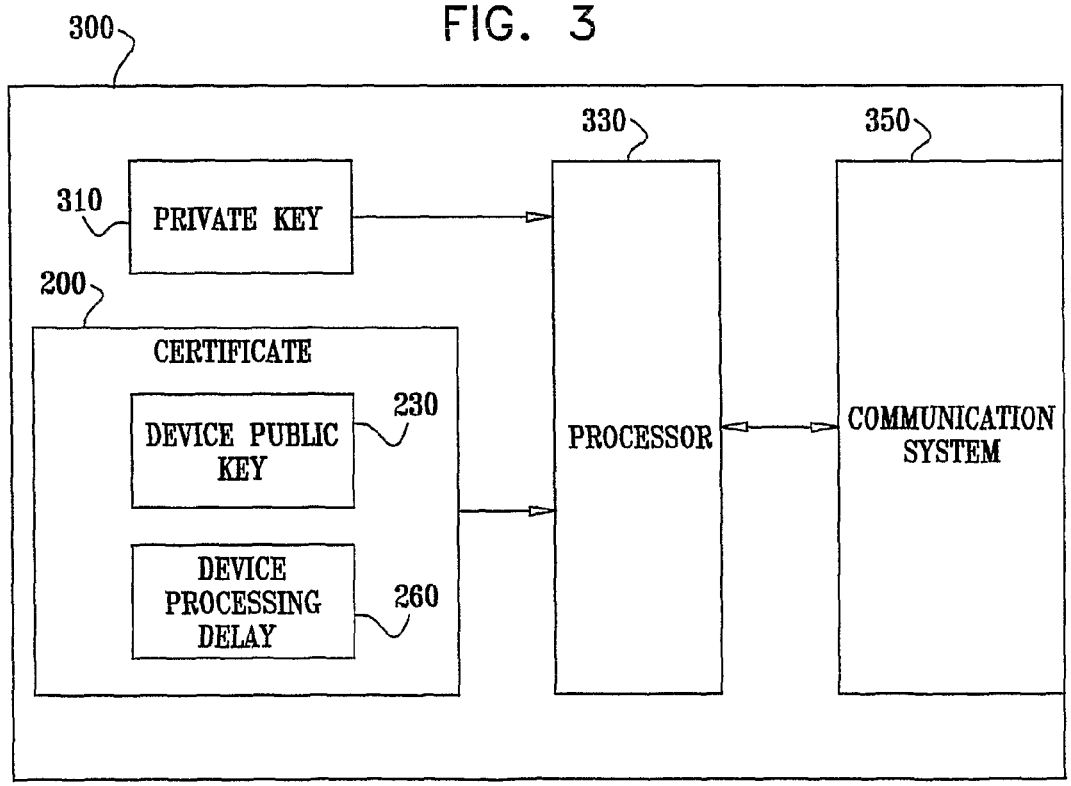

FIG. 10

START A TIMER UPON SENDING A PROXIMITY CHALLENGE FROM THE SECOND DEVICE TO THE FIRST DEVICE

STOP THE TIMER UPON RECEIVING A RESPONSE TO THE PROXIMITY CHALLENGE AT THE SECOND DEVICE

FIG. 11

RECORD A TIME OF SENDING THE PROXIMITY CHALLENGE FROM THE SECOND DEVICE TO THE FIRST DEVICE

RECORD A TIME OF RECEIVING THE RESPONSE TO THE PROXIMITY CHALLENGE FROM THE FIRST DEVICE TO THE SECOND DEVICE

SUBTRACT THE RECORDED TIME OF THE SENDING FROM THE RECORDED TIME OF THE RECEIVING, THEREBY DETERMINING THE GROSS TIME BETWEEN SENDING THE PROXIMITY CHALLENGE AND RECEIVING THE RESPONSE TO THE PROXIMITY CHALLENGE

SYSTEM FOR PROXIMITY DETERMINATION

CROSS REFERENCE TO RELATED APPLICATION

The present application claims priority from U.S. Provisional Patent Application 60/583,338, of Shen-Orr et al, filed 28 Jun. 2004, the disclosure of which is hereby incorporated herein by reference.

FIELD OF THE INVENTION

The present invention relates to networks that utilize secure devices and/or secure elements.

BACKGROUND OF THE INVENTION

A round-trip signal propagation time in a small "home" network is likely to be considerably smaller than a corresponding time in an "external" network, such as an internet-like network. In the "external" network propagation delays through switching elements, store-and-forward nodes, and so forth are likely to be much longer than propagation delays in the "home" network. A good estimate of an in-home round-trip propagation delay is less than approximately 10 milliseconds, whereas an external network will have a considerably longer round-trip propagation delay. Such a difference in propagation delay between an "external" network and a "home" is not only due to differences in physical distances within the networks, but also, and mainly, due to additional "hops" between network routers and other network elements.

Propagation delay by itself is not an acceptable measure of proximity between network elements because of the following reasons:
  It would be very easy for an eavesdropper or a hacker to create a propagation delay measurement deception,
  It is difficult to separate a "network" propagation delay (due to distance and intermediate agents) from a processing delay which is due to processing time in hardware and/or software of each network element.

Published PCT application WO 01/93434 of Xtemespectrum, Inc. describes a method, a device and a computer readable medium for enabling and blocking communications with a remote device based on a distance of the remote device. The method on which the device and computer readable medium are based includes transmitting a message from a local device to remote device via ultra wide band (UWB) wireless medium and receiving a response from the remote device via the UWB wireless medium. The transmitting and receiving steps are preferably performed in accordance with a Media Access Control (MAC) protocol. A distance between the local device and the remote device is then determined based on a time between the transmitting the message and the receiving of the response and a function, such as communicating with the remote device, is preformed in the local device based on the distance determined. The communication between the local device and the remote device may be enabled or disabled depending on the distance that the remote device is from the local device.

Published PCT application WO 02/35036 of Volvo Teknisk Utveckling AB describes a method for controlling authorization for access to an object, in which a signal communication via electromagnetic waves is established between the object and a wireless portable unit when a tripping device on the object is actuated. The signal communication comprises at least one first signal that is sent from the object to the portable unit, and at least one second signal that is sent from the portable unit to the object in response to the first signal. The second signal comprises sufficient information for verifying that the portable unit has an approved identity. The verification information is checked, a distance is measured between the object and the portable unit and the authorization is confirmed if both the checked verification information is approved is approved and the measured distance is less than a predetermined value. For the distance measurement, a time is measured for the transmission of at least one of the first signals and at least one of the second signals with verification information.

Published US Patent Application 2002/0087666 of Huffman et al. describes a Method for locating logical network addresses on electronically switched dynamic communications networks, such as the Internet, using the time latency of communications to and from the logical network address to determine its location. Minimum round-trip communications latency is measured between numerous stations on the network and known network addressed equipment to form a network latency topology map. Minimum round-trip communications latency is also measured between the stations and the logical network address to be located. The resulting set of minimum round-trip communications latencies is then correlated with the network latency topology map to determine the location of the network address to be located.

Published US Patent Application 2003/0046022 of Silverman describes a method for determining the physical location of a target device. Using communications network trace route and pinging commands, the distances of three test devices of known locations to the target device are determined; and responsive to those distances, the location of the target device is determined by triangulation. Based upon location, the target device may be blocked from a communications network or connected to a particular server.

Published PCT application WO 2004/014037 of Koninklijke Philips Electronics N.V. describes a method for a first communication device performing authenticated distance measurement between the first communication device and a second communication device. The first communication device and second communication share a common secret, the common secret is used for performing the distance measurement between the first and second communication devices.

Published PCT application WO 03/079638 of Koninklijke Philips Electronics N.V. describes a method for determination of proximity between nodes based on the communication time between the nodes. A source node communicates a query to a target node. The target node is configured to automatically send a response to the sender of the query. The communication time is determined based on the time duration between the transmission of the query and receipt of the response at the source node. The communication time is compared to a threshold value b determine whether the target node is local or remote relative to the source node.

Published PCT application 2004/030311 of Koninklijke Philips Electronics N.V. describes a method for determining the proximity of a target node to a source node from a response time required to communicate messages within a node-verification protocol. The node-verification protocol includes a query response sequence, wherein the source node communicates to a target node, and the target node communicates a corresponding response to the source node. The target node is configures to communicate two responses to the query: a first response that is transmitted immediately upon receipt of the query, and a second response based on the contents of the query. The communication time is determined based upon the time duration between the transmission of the query and receipt of the first response at the source node and the second response is compared for correspondence to the query, to verify the authenticity of the target node.

Published PCT application 2004/030312 of Koninklijke Philips Electronics N.V. describes a method including timing parameters within a node-verification protocol to determine the proximity of a target node to a source node. The node-verification protocol includes a query response sequence between the source node and the target node. The source node establishes a lower bound on the distance between the source node and the target node based on a measure of the time required to effect this query-response sequence including the time required to communicate the query and response, as well as the time required to process the query and generate the response to the source node. The target node includes a measure of the time required to process the query and generate the response to the source node. The source node subtracts this time from the total query-response time to determine the time consumed for the communication.

The Secure Video Processor (SVP) Alliance is a group which offers a standard secure method for digital content protection providing new opportunities for content delivery while ensuring protection for content owners, and low cost and ease of use for consumers. More information about the SVP Alliance, and SVPs is available on the World Wide Web at www.svpalliance.org. The information disclosed in the document found on the SVP Alliance website at www.svpalliance.org/docs/FAQ.pdfis hereby incorporated herein by reference.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, seeks to provide improved methods for securely measuring proximity between network elements in a network while minimizing hardware requirements through using facilities of secure devices and secure elements in the network, for example, which is not meant to be limiting, facilities of Secure Video Processors (SVPs).

There is thus provided in accordance with a preferred embodiment of the present invention a method for determining proximity between a first device and a second device, the method including providing a first device storing a first device private key, the first device having an associated secure first device certificate storing secured information, the secured information including a first device public key corresponding to the first device private key, providing a second device storing a second device private key, the second device having an associated secure second device certificate storing secured information, the secured information including a second device public key corresponding to the second device private key, and a second device processing delay, providing a copy of the second device certificate to the first device, establishing a secure authenticated channel between the first device and the second device, sending a proximity challenge from the first device to the second device, the proximity challenge including a numeric challenge value, receiving the proximity challenge at the second device, processing the proximity challenge at the second device to produce the response to the proximity challenge, and sending the response to the proximity challenge from the second device to the first device, receiving the response to the proximity challenge at the first device, and performing the following at the first device verifying, at the first device, that the response to the proximity challenge is legitimate, determining a gross time between sending the proximity challenge and receiving the response to the proximity challenge, subtracting the second device processing delay from the gross time to produce a net response time, and comparing the net response time to a first threshold and determining whether the first device and the second device are in proximity based on a result of the comparing.

Further in accordance with a preferred embodiment of the present invention the proximity challenge from the first device to the second device is digitally signed.

Still further in accordance with a preferred embodiment of the present invention the proximity challenge from the first device to the second device is encrypted.

Additionally in accordance with a preferred embodiment of the present invention the determining a gross time includes starting a first timer upon the sending the proximity challenge from the first device to the second device, and stopping the timer upon the receiving the response to the proximity challenge at the first device.

Moreover in accordance with a preferred embodiment of the present invention the determining a gross time includes recording a time of sending the proximity challenge from the first device to the second device, recording a time of the receiving the response to the proximity challenge from the second device to the first device, and subtracting the recorded time of the sending from the recorded time of the receiving, thereby determining the gross time between sending the proximity challenge and receiving the response to the proximity challenge.

Further in accordance with a preferred embodiment of the present invention the first threshold is included in a first content segment license.

Still further in accordance with a preferred embodiment of the present invention the first content segment license defines an average allowable time for the first threshold.

Additionally in accordance with a preferred embodiment of the present invention the average allowable time for the first threshold is a moving average allowable time.

Moreover in accordance with a preferred embodiment of the present invention the first content segment license defines a maximum allowable time for the first threshold.

Further in accordance with a preferred embodiment of the present invention the first content segment license defines a first repetition rate.

Still further in accordance with a preferred embodiment of the present invention the first repetition rate defines a repetition at a fixed interval.

Additionally in accordance with a preferred embodiment of the present invention the first repetition rate defines a repetition at a variable interval.

Moreover in accordance with a preferred embodiment of the present invention the maximum allowable time is set to zero.

Further in accordance with a preferred embodiment of the present invention the first content segment license is digitally signed in order to prevent tampering.

Still further in accordance with a preferred embodiment of the present invention the first device certificate also includes a field specifying a sum of time required for the first device to perform all computations involved in responding to the proximity challenge.

Additionally in accordance with a preferred embodiment of the present invention the establishing the Secure Authenticated Channel (SAC) occurs before sending the proximity challenge from the first device.

Moreover in accordance with a preferred embodiment of the present invention the secure first device certificate includes a first device processing delay.

Further in accordance with a preferred embodiment of the present invention, the method includes providing a copy of the first device certificate to the second device, sending a proximity challenge from the second device to the first device, the proximity challenge including a numeric challenge value, receiving the proximity challenge at the first device, processing the proximity challenge at the first device to produce the response to the proximity challenge, and sending the response to the proximity challenge from the first device to the second device, receiving the response to the proximity challenge at the second device, and performing the following at the second device verifying, at the second device, that the response to the proximity challenge is legitimate, determining a gross time between sending the proximity challenge and receiving the response to the proximity challenge, subtracting the first device processing delay from the gross time to produce a net response time, and comparing the net response time to a second threshold and determining whether the second device and the first device are in proximity based on a result of the comparing.

Still further in accordance with a preferred embodiment of the present invention the proximity challenge from the second device to the first device is digitally signed.

Additionally in accordance with a preferred embodiment of the present invention the proximity challenge from the second device to the first device is encrypted.

Moreover in accordance with a preferred embodiment of the present invention the determining a gross time includes starting a timer to upon the sending the proximity challenge from the second device to the first device, and stopping the timer upon the receiving the response to the proximity challenge at the second device.

Further in accordance with a preferred embodiment of the present invention the determining a gross time includes recording a time of sending the proximity challenge from the second device to the first device, recording a time of the receiving the response to the proximity challenge from the first device to the second device, and subtracting the recorded time of the sending from the recorded time of the receiving, thereby determining the gross time between sending the proximity challenge and receiving the response to the proximity challenge.

Still further in accordance with a preferred embodiment of the present invention the second threshold is included in a second content segment license.

Additionally in accordance with a preferred embodiment of the present invention the second content segment license defines an average allowable time for the second threshold.

Moreover in accordance with a preferred embodiment of the present invention the average allowable time for the second threshold is a moving average allowable time.

Further in accordance with a preferred embodiment of the present invention the second content segment license defines a maximum allowable time for the second threshold.

Still further in accordance with a preferred embodiment of the present invention the second content segment license defines a second repetition rate.

Additionally in accordance with a preferred embodiment of the present invention the second repetition rate defines a repetition at a fixed interval.

Moreover in accordance with a preferred embodiment of the present invention the second repetition rate defines a repetition at a variable interval.

Further in accordance with a preferred embodiment of the present invention the maximum allowable time is set to zero.

Still further in accordance with a preferred embodiment of the present invention the second content segment license is digitally signed in order to prevent tampering.

Additionally in accordance with a preferred embodiment of the present invention the second device certificate also includes a field specifying a sum of time required for the device to perform all computations involved in responding to the proximity challenge.

Moreover in accordance with a preferred embodiment of the present invention the establishing the Secure Authenticated Channel (SAC) occurs before sending the proximity challenge from the second device.

There is also provided in accordance with another preferred embodiment of the present invention a certificate storing secured information relating to a device, the device storing a device private key, the secured information including a device public key corresponding to the device private key, and a device processing delay.

There is also provided in accordance with still another preferred embodiment of the present invention a device including a communications system operative to communicate with other devices, a private key for encrypting communication between the device and the other devices, a secure device certificate storing secured information, the information including a public key corresponding to the device private key, and a device processing delay, and a processor operative to receive input from the communications system, decrypt the input using the public key, encrypt output using the private key, and send the encrypted output to the communications system for communicating with other devices.

Further in accordance with a preferred embodiment of the present invention the communication system includes a wireless communication system.

Still further in accordance with a preferred embodiment of the present invention the communication system includes a wire based communication system.

BRIEF DESCRIPTION OF THE DRAWINGS

The present invention will be understood and appreciated more fully from the following detailed description, taken in conjunction with the drawings in which:

FIG. 2 is a simplified block diagram illustration of one preferred embodiment of a device certificate, comprising information used during the challenge-response sequence of FIG. 1;

FIG. 3 is a simplified block diagram of a device comprising the device certificate of FIG. 2;

FIG. 10 is a simplified flowchart diagram of a preferred method of implementation of a method of time determination in the second device within the system of FIG. 9; and FIG. 11 is a simplified flowchart diagram of an alternative preferred method of implementation of a method of time determination in the second device within the system of FIG. 9.

DETAILED DESCRIPTION OF A PREFERRED EMBODIMENT

The concept of Secure Video Processor (SVP) is described in the document found on the World Wide Web at www.svpalliance.org/docs/FAQ.pdf. The SVP is proposed by the SVP Alliance, as described at www.svpalliance.org, for increasing content security in a Home Network environment and a Video On-Demand (VOD) environment. Typically, each SVP device has a Device Certificate, signed by an "Ancestor". The Certificate contains various pieces of data relating to the device's properties and restrictions placed upon it, and also a public key. The device also has a private key paired to the public key, but such private key is preferably held in secret by the device.

Content secured by an SVP device, or a system using SVP devices, is scrambled and scrambling keys (or Control Words—CWs) and other control information is passed between individual SVP devices through a Secure Authenticated Channel (SAC).

As a precursor to SAC setup, any two SVP devices exchange certificates, and each party verifies the other party's certificate. Verification is obtained through a procedure in which a signature of each certificate is checked against a public key of its "ancestor", until arriving at a known common ancestor. Such a procedure is known as a "Chain of Trust". It is appreciated that such a procedure may be lengthy, but it does not have to be carried out repeatedly (provided that each of the devices keeps the other party's certificate in a memory).

Figure 1:
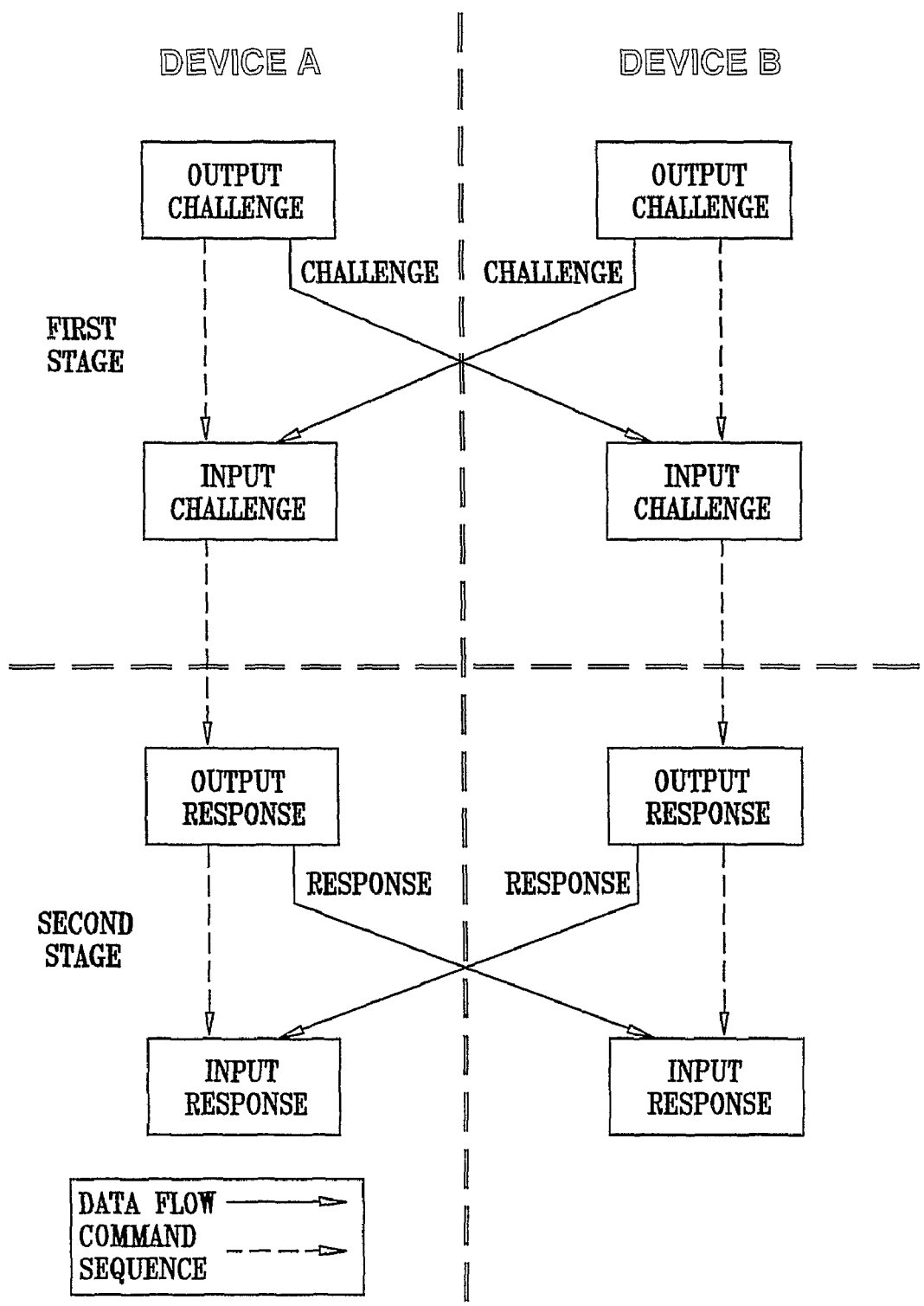
FIG. 1 is a simplified flowchart illustration of a bidirectional Challenge-Response Sequence or "Handshake" procedure through a Secure Authenticated Channel (SAC) in accordance with a preferred embodiment of the present invention.

A SAC is established through a Challenge-Response Sequence, or a "Handshake" procedure as shown in FIG. 1. The Challenge-Response Sequence or the "Handshake" procedure is implemented as follows:

A challenge is issued by one party, for example, side A, and a corresponding challenge is issued by the other party, for example, side B. The data in each party's Challenge includes a random number, and is encrypted to the Public Key included in the other party's Certificate.

Each party combines its challenge random data with the other party's random data to produce a combination random number. If the two parties are genuine (that is, possess the correct private key corresponding to the certificate's public key), these combinations will be identical. Thus, the combination random number can be used as a shared key.

The shared key is used by both parties to sign their corresponding Response structure which may, for example, contain additional information.

The receiving party validates the other party's Response by checking its signature against the shared key. This completes the handshake for that device.

The shared key may now be used to secure (encrypt/sign) control information.

In the same manner that a Device Certificate securely holds information relative to the device's properties and restrictions, each content segment is accompanied by a secured control structure called "Content Segment License" (CSL). A CSL contains (signed) data relating to requirements and limitations imposed on a particular content segment.

In accordance with a preferred embodiment of the present invention proximity measurement between any two devices is accomplished through measuring a time required either to complete a "Handshake" procedure (Challenge-Response Sequence) or to reply to a message sent through an existing SAC. Time may be adjusted by values securely included in Device Certificates and CSLs.

Each particular content item may have different requirements in regard to proximity. Each CSL preferably contains fields specifying one or more values of characterizing "threshold" net round-trip time—average, maximum, and so forth. Other examples of such fields are related to the statistical manner in which measurement should be taken (for example, repetition rate). Some of that data may be fixed ("default"), in which case there is no need to include it in the CSL. Various schemes may be utilized to reduce the amount of data added to the CSL for such purpose (for example, indicating by a bit whether default parameter values are to be used, in which case there is no need to transmit the values themselves).

Each Device Certificate would contain fields specifying one or more values characterizing the device's intrinsic delay, for example, the sum of the time required for the device to do all computations involved in responding to a proximity challenge, the likely variation of such a delay, and so forth.

A first proximity measurement method, in accordance with a preferred embodiment of the present invention, may be performed with an existing SAC. The first proximity measurement method is preferably implemented as follows:

Define a command for the Security Kernel to generate a random number and send it over the SAC—encrypted and signed with the SAC shared (session) key, with the message type defined as "Proximity Challenge". The originating device (originator) initiates a timer or records a time measurement in parallel.

A target device (the other party to the SAC) checks the signature, decrypts the random number, performs an operation on the random number (for example, bit inversion, XOR with a known number, and so forth), re-encrypts/signs the random number to the same key and sends it back to the originator in a message.

The originator receives the message and stops the timer or records a second time measurement, checks the signature, decrypts the returned number, and checks that it is correct. If it is correct, the timer reading is used to calculate the net propagation time A second proximity measurement method, in accordance with a preferred embodiment of the present invention, may be performed with a new Handshake (a new SAC). In such a case a special command/type is not required. The second proximity measurement method may be implemented in two ways.

In the first way, the second proximity measurement method may be implemented by measuring a time from Output Challenge to Input Response as follows:

Initiate a Handshake procedure with a target device (that is, issue a challenge). In parallel, initiate a timer or record a time measurement Receive a challenge from the target, process it (optionally) issue a Response Receive a response from the target device Validate that response Stop the timer or record a second time measurement Calculate net propagation time In the second way, the second proximity measurement method may be implemented by measuring a time from Output Response to Input Response as follows:

Send a challenge, receive a challenge, and calculate the session key

Issue a response. In parallel initiate a timer or record a time measurement

Receive a response from the target device

Validate that response

Stop the timer or record a second time measurement

Calculate net propagation time

It is appreciated that net propagation time may be calculated by subtracting the sum of intrinsic processing delays (obtained from the device's own certificate and the target device's certificate) from the value recorded by the timer. A result thus obtained may preferably be compared with the threshold value specified by the CSL.

The following is to be noted:

With the first proximity measurement method, the processing time may be small enough to be negligible, resulting in a simpler system The first way of implementation of the second proximity measurement method may be used by both parties simultaneously, but internal processing involves public-key cryptography and may be much longer than the net propagation delay. The second way of implementation of the second proximity measurement method requires very short processing time, but may be used only in one direction in each Handshake.

The implementations described above may be expanded to include various statistics and repeat operations (for example, moving average, second-order statistics, outlier rejection, repeat at fixed or variable intervals, repeat frequency, and so forth)

It is preferred to specify a CSL value (for example, Maximum Net Propagation Time=0) that inhibits use of any one of the proximity measurement methods mentioned above.

To prevent abuse, a CSL field may specify a value of the maximum acceptable device intrinsic processing delay.

It is appreciated that the present invention is not limited to SVPs; rather, the present invention may alternatively or additionally be implemented by communicating secure devices and secure elements other than SVPs, where the secure devices and the secure elements similarly perform any of the proximity measurement methods mentioned above.

Reference is now made to FIG. 2, which is a simplified block diagram illustration of one preferred embodiment of a device certificate 200, comprising information used during the challenge-response sequence of FIG. 1. As has been explained above, the device certificate 200 comprises a public key 230. As explained above, the public key 230 is used to decrypt communication between the device and other devices with which the device is securely communicating. A device intrinsic processing delay 260 is also comprised in the device certificate 200. The device intrinsic processing delay 260 is explained in detail above.

Reference is now made to FIG. 3, which is a simplified block diagram of a device 300 comprising the device certificate 200 of FIG. 2. The device 300 comprises standard hardware and software, which, for ease of depiction, are not shown in FIG. 3.

The device 300 comprises a device private key 310. The device private key 310 is used to encrypt communication between the device 300 and other devices. The device 300 further comprises a processor 330 which is operative to receive, via a communications system 350, incoming communications from other devices. The communications system 350 comprises standard hardware and software, which, for ease of depiction, are not shown in FIG. 3. The processor uses the public key 230 to decrypt incoming encrypted communications from other devices. The processor 330 is also operative to encrypt, using the device private key 310, communications from the device 300 to other devices. Communications from the device 300 to other devices are sent from the processor 330 to the communication system 350, and from the communication system 350 to other devices.

Figure 4:
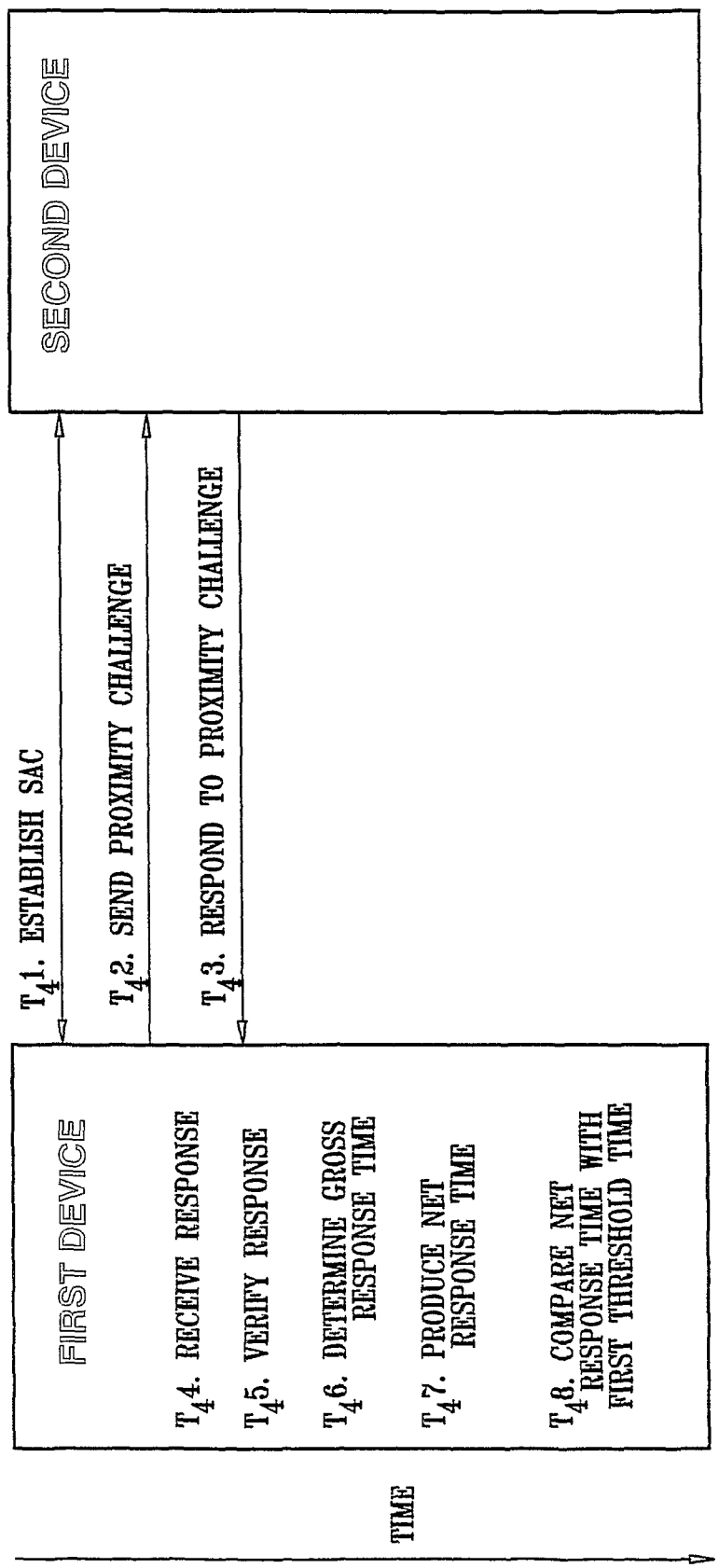
FIG. 4 is a simplified timeline illustration of dataflow in a preferred embodiment of a unidirectional challenge-response sequence, similar to the preferred embodiment of the bidirectional challenge-response sequence of FIG. 1.

Reference is now made to FIG. 4, which is a simplified timeline illustration of dataflow in a preferred embodiment of a unidirectional challenge-response sequence, similar to the preferred embodiment of the bidirectional challenge-response sequence of FIG. 1. As the time axis indicates, time is depicted flowing from the top of FIG. 4 to the bottom of FIG. 4. Events occurring in FIG. 4 are depicted indicating whether they occur at a first device or as data flowing from one device to another or between both devices. The events depicted in FIG. 4 are numbered as T_m (T4I, T42, ..., T48), where n increases from 1 to 8.

Figure 5:
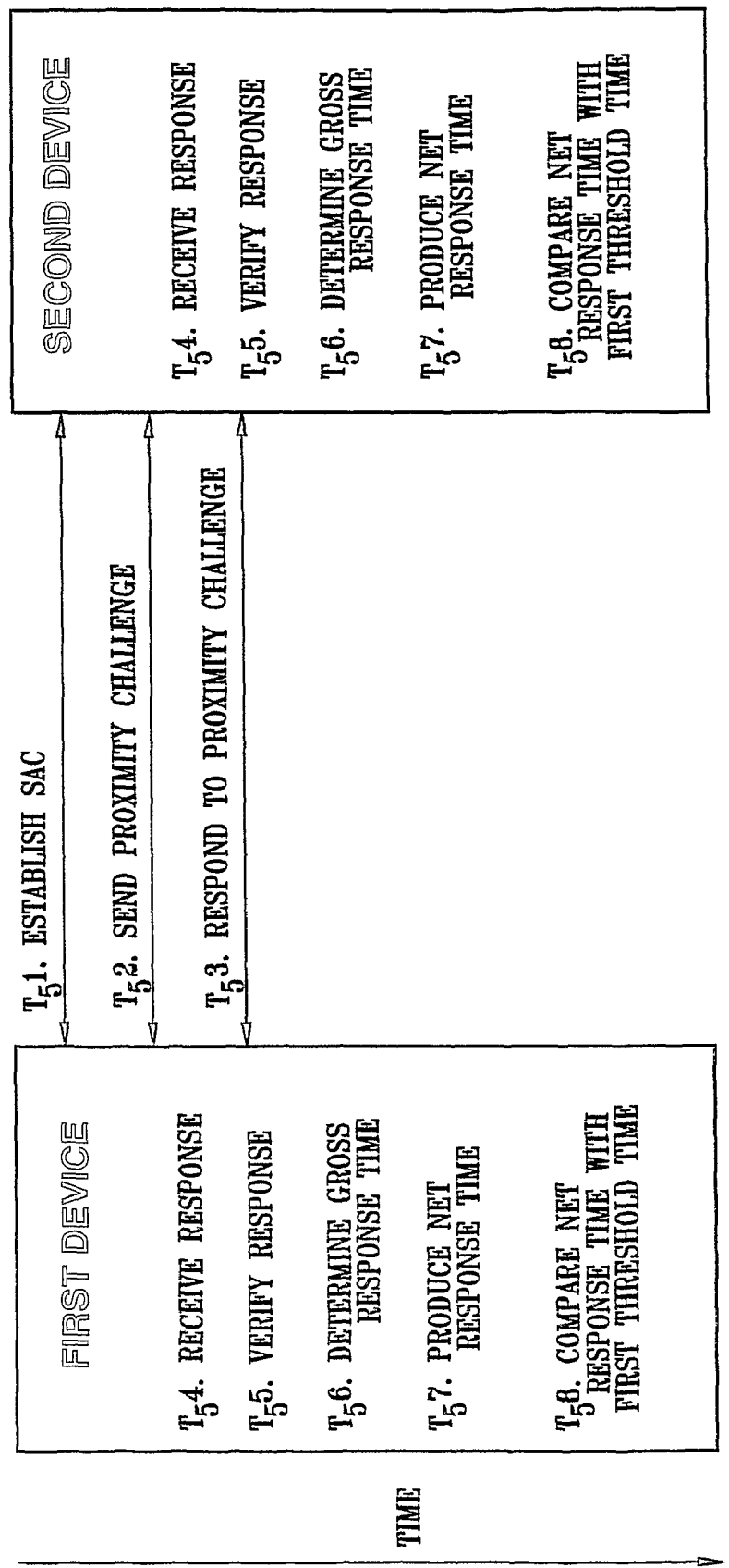
FIG. 5 is a simplified timeline illustration of dataflow in a preferred embodiment of the bidirectional challenge-response sequence, similar to the preferred embodiment of the bidirectional challenge-response sequence of FIG. 1.

Reference is now made to FIG. 5, which is a simplified timeline illustration of dataflow in a preferred embodiment of the bidirectional challenge-response sequence, similar to the preferred embodiment of the bidirectional challenge-response sequence of FIG. 1. As the time axis indicates, time is depicted flowing from the top of FIG. 5 to the bottom of FIG. 5. Events occurring in FIG. 5 are depicted indicated whether they occur at the first device or as data flowing from one device to another or between both devices. The events depicted in FIG. 5 are numbered as $T_5n$ (T5I, T52, ..., T58), where n increases from 1 to 8.

It is appreciated that some time in advance of the challenge-response sequence depicted in FIG. 4 the first device needs to have received the device certificate of a second device. Similarly, in advance of the challenge-response sequence depicted in FIG. 5, the first device needs to have received the device certificate of the second device, and the second device needs to have received the device certificate of the first device. The device certificate may be received by direct exchange, from a trusted third party, may be burned in when the device is manufactured, or in any other appropriate fashion.

Reference is now made to FIGS. 6-11.

Figure 6:
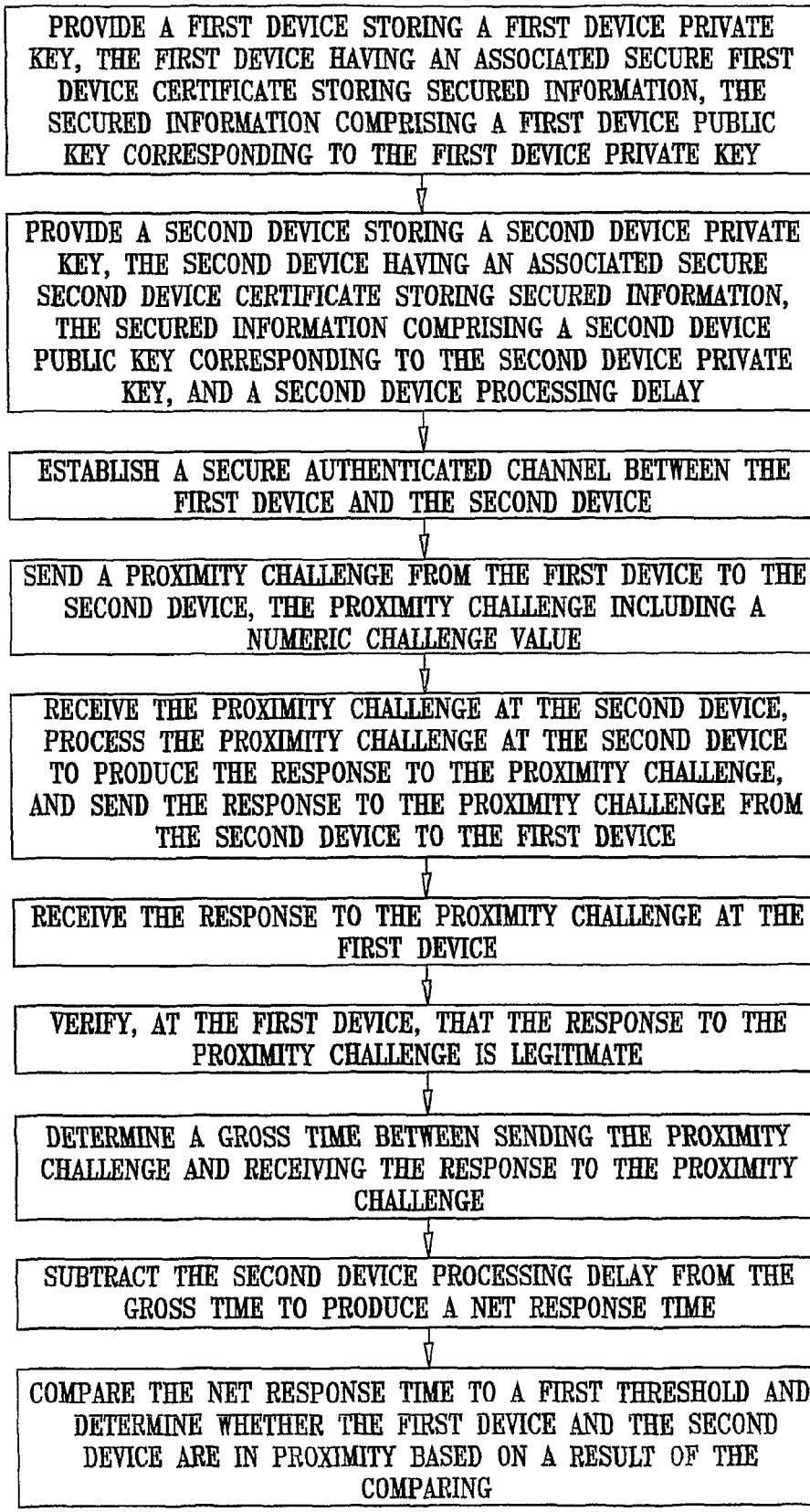
FIG. 6 is a simplified flowchart diagram of a preferred method of implementation unidirectional proximity measurement in a first device incorporating a challenge-response sequence similar to the preferred embodiment of the bidirectional challenge-response sequence of FIG. 1.
Figure 7:
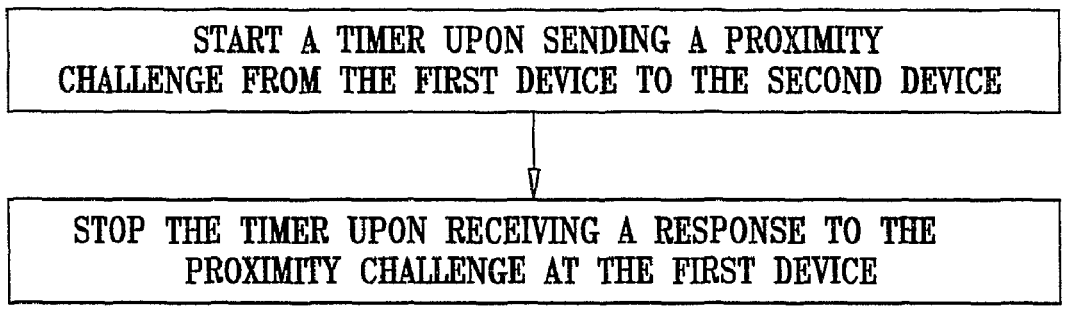
FIG. 7 is a simplified flowchart diagram of a preferred method of implementation of a method of time determination in the first device within the system of FIG. 6.
Figure 8:
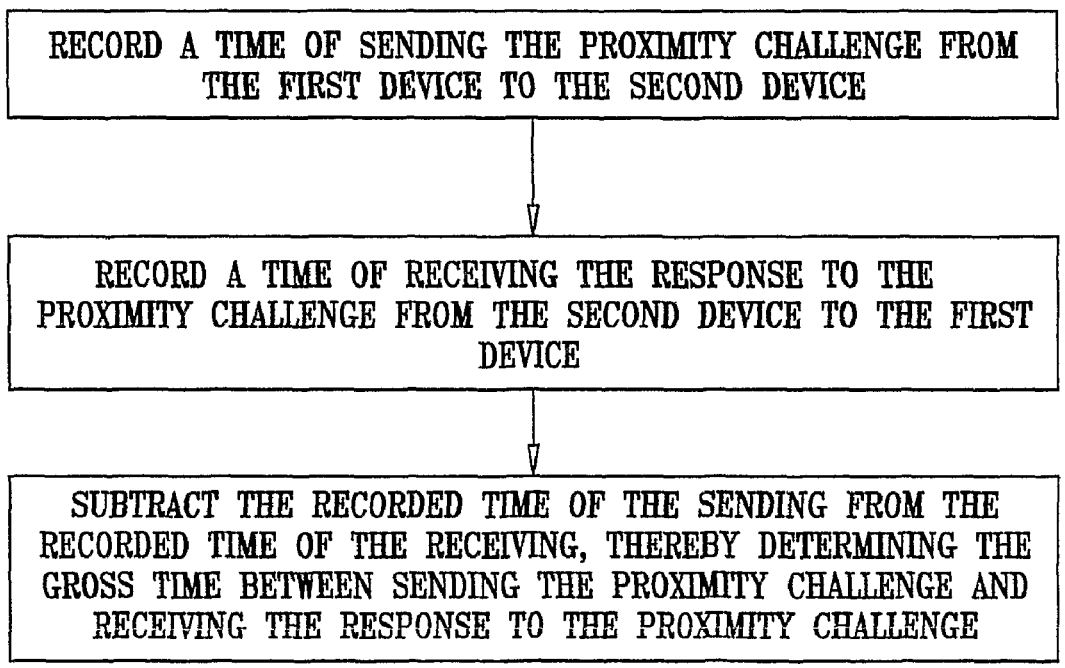
FIG. 8 is a simplified flowchart diagram of an alternative preferred method of implementation of a method of time determination in the first device within the system of FIG. 6.
Figure 9:
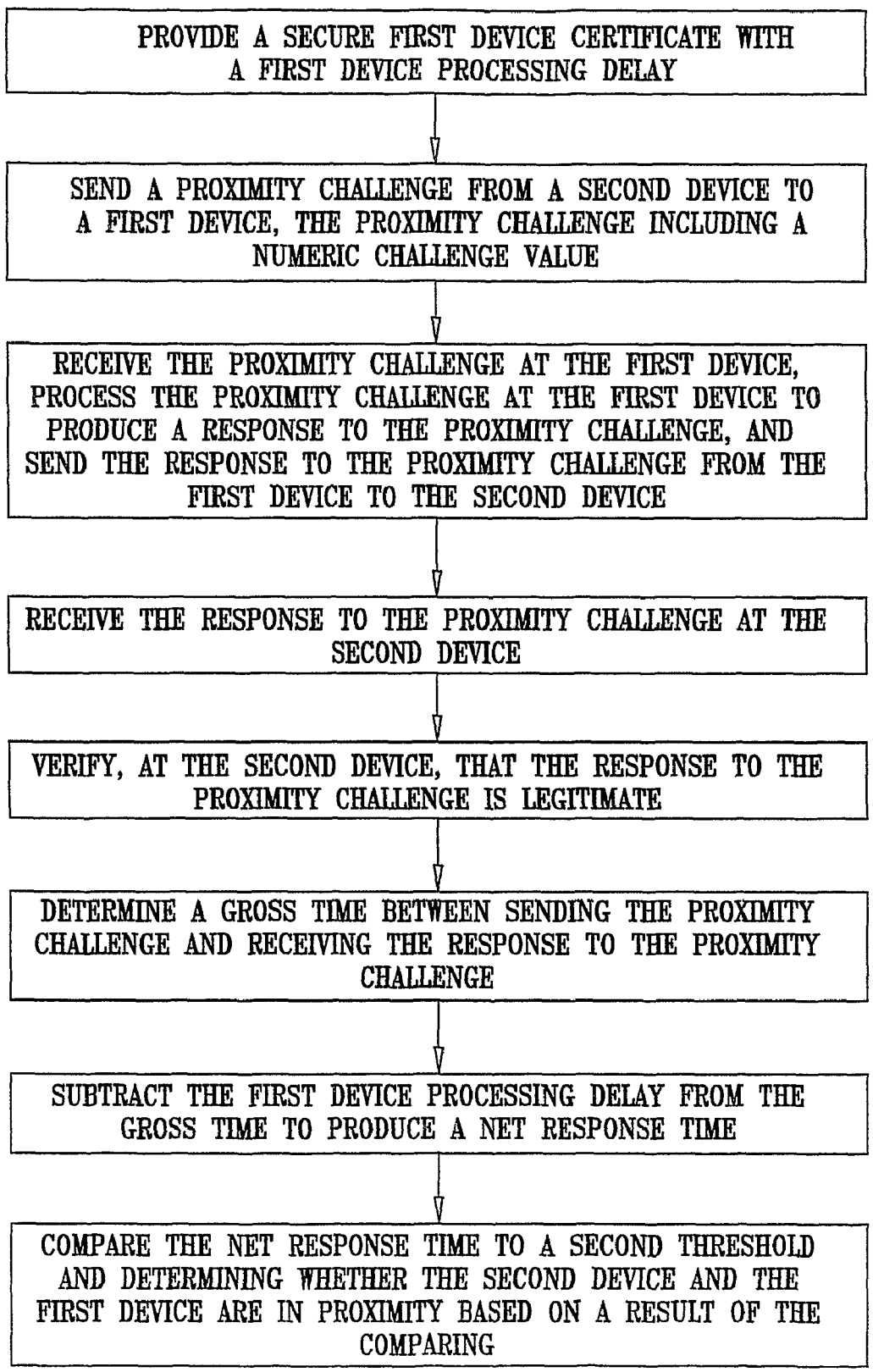
FIG. 9 is a simplified flowchart diagram of a preferred method of implementation of unidirectional proximity measurement in a second device incorporating a challenge-response sequence similar to the preferred embodiment of the bidirectional challenge-response sequence of FIG. 1.

FIG. 6 is a simplified flowchart diagram of a preferred method of implementation unidirectional proximity measurement in a first device incorporating a challenge-response sequence similar to the preferred embodiment of the bidirectional challenge-response sequence of FIG. 1;

FIG. 7 is a simplified flowchart diagram of a preferred method of implementation of a method of time determination in the first device within the system of FIG. 6;

FIG. 8 is a simplified flowchart diagram of an alternative preferred method of implementation of a method of time determination in the first device within the system of FIG. 6;

FIG. 9 is a simplified flowchart diagram of a preferred method of implementation of unidirectional proximity measurement in a second device incorporating a challenge-response sequence similar to the preferred embodiment of the bidirectional challenge-response sequence of FIG. 1;

FIG. 10 is a simplified flowchart diagram of a preferred method of implementation of a method of time determination in the second device within the system of FIG. 9;

FIG. 11 is a simplified flowchart diagram of an alternative preferred method of implementation of a method of time determination in the second device within the system of FIG. 9.

The methods of FIGS. 6-11 are believed to be self explanatory in light of the above discussion of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for determining proximity between a first device and a second device, the method comprising:
providing a first device storing a first device private key, the first device having an associated secure first device certificate storing secured information, the secured information comprising:
a first device public key corresponding to the first device private key;
providing a second device storing a second device private key, the second device having an associated secure second device certificate storing secured information, the secured information comprising:
a second device public key corresponding to the second device private key; and
a second device processing delay;
providing a copy of the second device certificate to the first device;
establishing a secure authenticated channel between the first device and the second device;
sending a first proximity challenge from the first device to the second device, the proximity challenge including a numeric challenge value;
receiving the first proximity challenge at the second device, processing the proximity challenge at the second device to produce a response to the first proximity challenge, and sending the response to the first proximity challenge from the second device to the first device;
receiving the response to the first proximity challenge at the first device; and
performing the following at the first device:
verifying, at the first device, that the response to the first proximity challenge is legitimate;
determining a gross time between sending the first proximity challenge and receiving the response to the first proximity challenge;
subtracting the second device processing delay from the gross time to produce a first net response time; and
comparing the first net response time to a first threshold and determining whether the first device and the second device are in proximity based on a result of the comparing.

2. The method according to claim 1 and wherein the first proximity challenge from the first device to the second device is digitally signed.

3. The method according to claim 1 and wherein the first proximity challenge from the first device to the second device is encrypted.

4. The method according to claim 1 and wherein the determining a gross time comprises:
starting a first timer upon the sending the first proximity challenge from the first device to the second device; and
stopping the timer upon the receiving the response to the first proximity challenge at the first device.

5. The method according to claim 1 and wherein the determining a gross time comprises:
recording a time of sending the first proximity challenge from the first device to the second device;
recording a time of the receiving the response to the first proximity challenge from the second device to the first device; and
subtracting the recorded time of the sending from the recorded time of the receiving, thereby determining the gross time between sending the first proximity challenge and receiving the response to the first proximity challenge.

6. The method according to claim 1 wherein the first threshold is comprised in a first content segment license.

7. The method according to claim 6 and wherein the first content segment license defines an average allowable time for the first threshold.

8. The method according to claim 7 and wherein the average allowable time for the first threshold is a moving average allowable time.

9. The method according to claim 6 and wherein the first content segment license defines a maximum allowable time for the first threshold.

10. The method according to claim 6 and wherein the first content segment license defines a first repetition rate.

11. The method according to claim 10 and wherein the first repetition rate defines a repetition at a fixed interval.

12. The method according to claim 10 and wherein the first repetition rate defines a repetition at a variable interval.

13. The method according to claim 9 and wherein the maximum allowable time is set to zero.

14. The method according to claim 6 and wherein the first content segment license is digitally signed in order to prevent tampering.

15. The method according to claim 1 and wherein the first device certificate also comprises a field specifying a sum of time required for the first device to perform all computations involved in responding to a proximity challenge.

16. The method according to claim 1 and wherein the establishing the Secure Authenticated Channel (SAC) occurs before sending the first proximity challenge from the first device.

17. The method according to claim 1 and wherein the secure first device certificate comprises a first device processing delay.

18. The method according to claim 17 and also comprising:
providing a copy of the first device certificate to the second device;
sending a second proximity challenge from the second device to the first device, the second proximity challenge including a numeric challenge value;
receiving the second proximity challenge at the first device, processing the second proximity challenge at the first device to produce a response to the second proximity challenge, and sending the response to the second proximity challenge from the first device to the second device;

receiving the response to the second proximity challenge at the second device; and performing the following at the second device:

verifying, at the second device, that the response to the second proximity challenge is legitimate;

determining a gross time between sending the second proximity challenge and receiving the response to the second proximity challenge;

subtracting the first device processing delay from the gross time between sending the second proximity challenge and receiving the response to the second proximity challenge to produce a second net response time; and comparing the second net response time to a second threshold and determining whether the second device and the first device are in proximity based on a result of comparing the second net response time to the second threshold.

19. The method according to claim 18 and wherein the second proximity challenge from the second device to the first device is digitally signed.

20. The method according to claim 18 and wherein the second proximity challenge from the second device to the first device is encrypted.

21. The method according to claim 18 and wherein the determining a gross time at the second device comprises:

starting a timer to upon the sending the second proximity challenge from the second device to the first device; and stopping the timer upon the receiving the response to the second proximity challenge at the second device.

22. The method according to claim 18 and wherein the determining a gross time at the second device comprises:

recording a time of sending the second proximity challenge from the second device to the first device;

recording a time of the receiving the response to the second proximity challenge from the first device to the second device; and subtracting the recorded time of sending the second proximity challenge from the recorded time of receiving the response to the second proximity challenge, thereby determining the gross time between sending the second proximity challenge and receiving the response to the second proximity challenge.

23. The method according to claim 18 wherein the second threshold is comprised in a second content segment license.

24. The method according to claim 23 and wherein the second content segment license defines an average allowable time for the second threshold.

25. The method according to claim 24 and wherein the average allowable time for the second threshold is a moving average allowable time.

26. The method according to claim 23 and wherein the second content segment license defines a maximum allowable time for the second threshold.

27. The method according to claim 23 and wherein the second content segment license defines a second repetition rate.

28. The method according to claim 27 and wherein the second repetition rate defines a repetition at a fixed interval.

29. The method according to claim 27 and wherein the second repetition rate defines a repetition at a variable interval.

30. The method according to claim 26 and wherein the maximum allowable time for the second threshold is set to zero.

31. The method according to claim 23 and wherein the second content segment license is digitally signed in order to prevent tampering.

32. The method according to claim 18 and wherein the establishing the Secure Authenticated Channel (SAC) occurs before sending the second proximity challenge from the second device.

33. A device comprising:

a communications system operative to communicate with other devices; and wherein the device is operative to perform the steps performed by at least one of the first device and the second device in accordance with the method of claim 1.

34. The device according to claim 33 and wherein the communication system comprises a wireless communication system.

35. The device according to claim 33 and wherein the communication system comprises a wire based communication system.

* * * * *

UNITED STATES PATENT AND TRADEMARK OFFICE
CERTIFICATE OF CORRECTION

PATENT NO. : 8,051,292 B2
APPLICATION NO. : 11/629435
DATED : November 1, 2011
INVENTOR(S) : Shen-Orr et al.

Page 1 of 1

It is certified that error appears in the above-identified patent and that said Letters Patent is hereby corrected as shown below:

delete "sec and" and insert therefor --second-- in Col. 13, Line 4 (13th line of claim 18).

Signed and Sealed this
Fifth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,051,292 B2
APPLICATION NO. : 11/629435
DATED : November 1, 2011
INVENTOR(S) : Shen-Orr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1196 days.

Signed and Sealed this
Twelfth Day of November, 2013

Teresa Stanek Rea
*Deputy Director of the United States Patent and Trademark Office*